May 6, 1969     A. L. MASTERS     3,441,979
POULTRY PICKING MACHINE
Filed Dec. 21, 1966
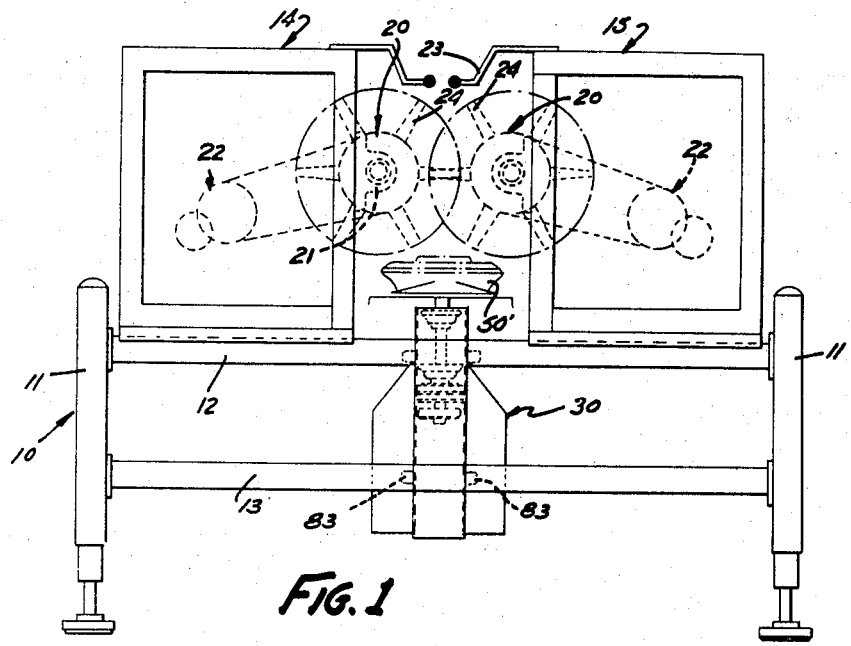

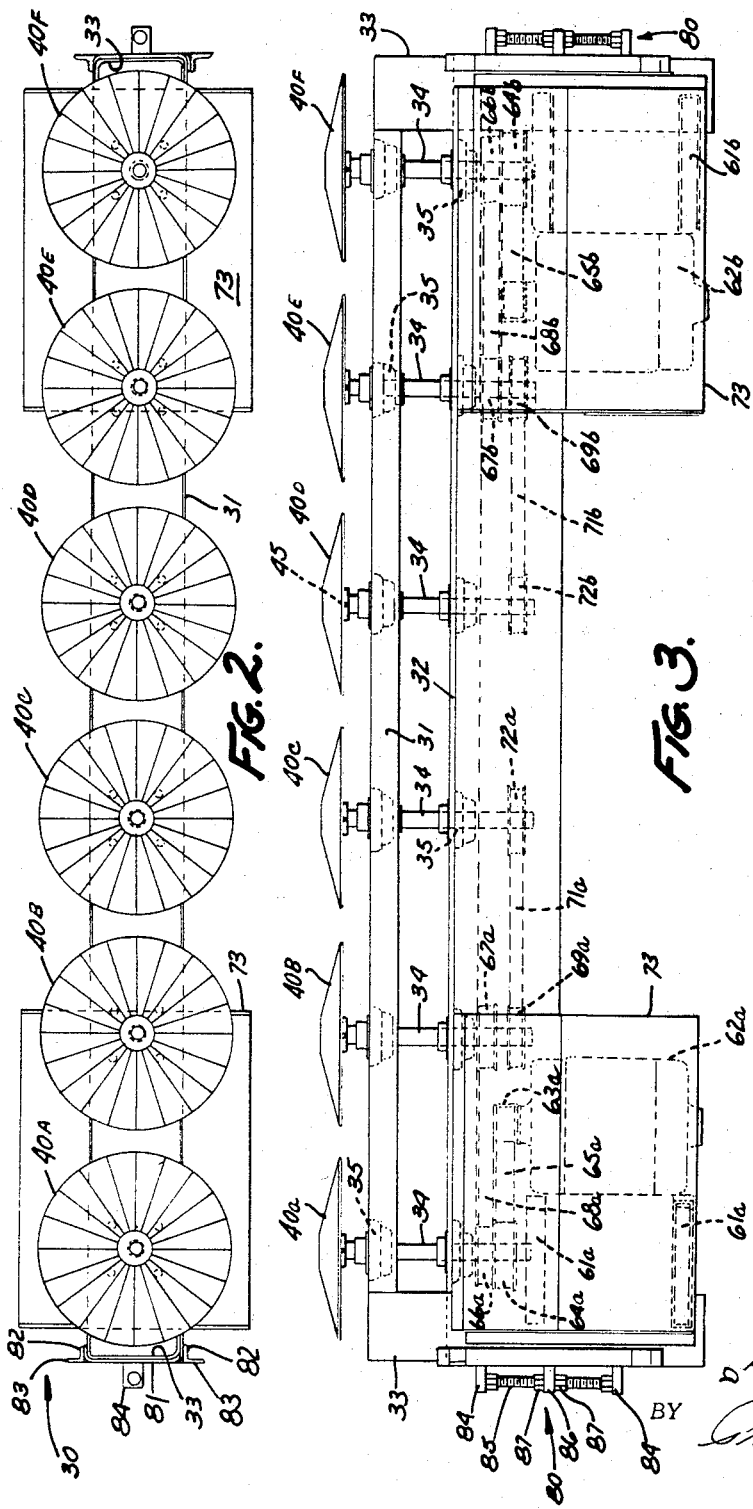

May 6, 1969 A. L. MASTERS 3,441,979
POULTRY PICKING MACHINE
Filed Dec. 21, 1966 Sheet 3 of 4

INVENTOR.
ALLEN L. MASTERS
BY
ATTORNEYS

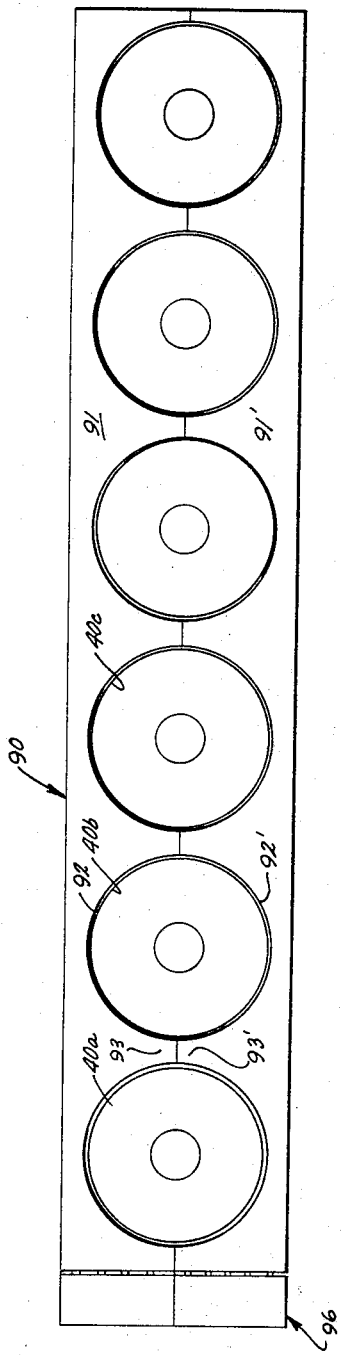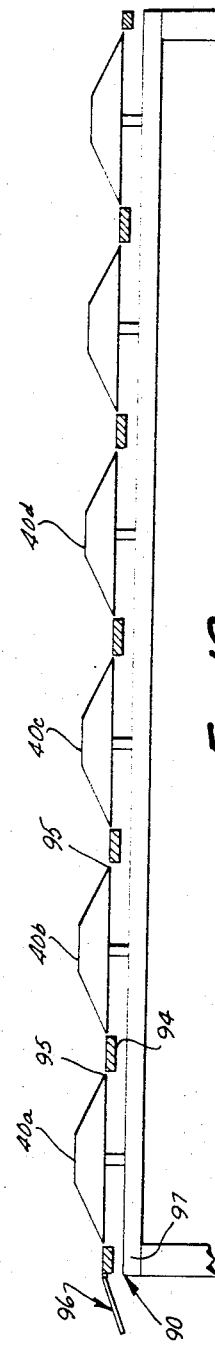

United States Patent Office 3,441,979
Patented May 6, 1969

3,441,979
POULTRY PICKING MACHINE
Allen L. Masters, Ottumwa, Iowa, assignor to International Agri-Systems, Inc., Ottumwa, Iowa, a corporation of Iowa
Continuation-in-part of application Ser. No. 525,969, Feb. 8, 1966. This application Dec. 21, 1966, Ser. No. 603,525
Int. Cl. A22c 21/02
U.S. Cl. 17—11.1          11 Claims

ABSTRACT OF THE DISCLOSURE

An apparatus for picking fowl comprising two elongated drum pickers mounted in side-by-side relationship on a suitable frame between which the fowl to be picked are adapted to pass. The drums have flexible fingers attached thereto and are rotated by any conventional means such as a motor. Mounted below the path and rotatable about an axis directed vertically toward the path are a series of aligned frusto-conical finger supports upon which are mounted sets of flexible fingers. The frusto-conical finger supports are rotated during utilization of the apparatus. It is understood that this abstract is not to be utilized to limit the scope of this invention.

---

This application is a continuation-in-part of co-pending application Ser. No. 525,969, filed Feb. 8, 1966, now abandoned.

Background

This invention relates to poultry picking machines and, more particularly, to a finger poultry picking machine embodying a unique finger support structure.

Rotary drum poultry picking machines, commonly referred to in the art as "slant pickers," are well-known in the poultry processing industry. These pickers employ a pair of spaced rotary drums, each having a plurality of flexible rubber picking fingers extending from the periphery thereof. The rotary drums are mounted for rotation upon a suitable support with their axes of rotation generally parallel. Adjacent peripheral sections of the drums define a pathway through which the chickens or other types of poultry are carried by suitable conveyor means. As the bird passes between the two drums, it is contacted by the plurality of flexible picking fingers extending therefrom and its feathers are wiped away. Generally, the two rotary drums rotate in opposite directions such that they tend to pull the bird downwardly as it passes between them. Alternatively, however, it is possible that the drums may be rotated in opposite directions or that different segments of their individual longitudinal lengths may be rotated in different directions. In the latter case, the birds are sequentially subjected to differently directed picking forces as they pass between the rotary drums.

By utilizing slant pickers of the type generally described above, it is possible to defeather birds in a continuous conveyor operation. This, of course, results in an over-all saving of time, labor and expense. The slant picker, however, is subject to the limitation that all of the feathers on the bird being processed cannot be removed during passage through a single machine. This is because the abutting or intermeshing sections of the picking drums have insufficient contact area to rub the feathers from all parts of the chicken. Thus, if the conveyor is arranged relative to the machine such that the bird's main body is subjected to the primary picking force, feathers will be left at the wing tips and the neck because these members hang below the abutting or intermeshing sections of the rotating picking drums.

One possible solution to this problem is suggested in United States Patent No. 3,203,035 issued Aug. 31, 1965, to H. J. De Long. The machine shown in this patent has a plurality of secondary picking drums mounted below the two primary picking drums and rotating about axes which are perpendicular to those of the primary picking drums. The secondary picking drums have fingers extending from them which, during a segment of each revolution, pass into the path of bird travel and thus contact the wings and neck of the bird being processed.

While this device has alleviated to some extent the problem of defeathering the wings and neck, it has not solved it completely. There is still insufficient interaction between the primary and secondary picking drums to insure that all of the feathers will be wiped from the bird being processed. More importantly, machines of this type have a marked tendency to fracture and multilate the upper section of the bird body, rendering them unacceptable for high inspection ratings, and thus, maximum market prices.

Objects and specification

It is an object of this invention to provide a poultry picking machine which is not subject to the above outlined disadvantages.

More particularly, it is an object of this invention to provide a poultry picking machine which utilizes, in conjunction with a conventional set of longitudinal drums, a unique finger support positioned adjacent the bottom of the path of travel of the bird which is capable of efficiently and completely removing the feathers from the bird during its passage through the machine.

More specifically, it is an object of this invention to provide a finger support for utilization in conjunction with a conventional picking machine which causes the neck and wing portions of the bird being processed to be subjected to a massaging action which is effective to remove all the feathers therefrom and, yet, sufficiently gentle to prevent severing or mutilation of these sections of the bird body.

It is an object of this invention to provide a finger support system for utilization in conjunction with a conventional slant picker which is effective to massage the wings and neck of the bird being processed in such a manner that they are rendered more flexible and do not tend to break or multilate when subjected to wiping actions of sufficient force to remove the feathers therefrom.

These and other objects of this invention will be clearly understood by reference to the following specification and accompanying figures in which:

FIG. 1 is an end-elevational view of a conventional slant picker having the lower picking assembly which is the subject of this invention incorporated therein;

FIG. 2 is a plan view of the lower picking assembly;

FIG. 3 is a side-elevational view of the lower picking assembly;

FIG. 4 is an end-elevational view of the lower picking assembly;

FIG. 6 is a fragmentary side-elevational view, partially in cross-section, indicating the manner in which the flexible picking fingers are received and retained by the finger supporting cones;

FIG. 10 is a schematic side-elevational view of the finger support with the picking fingers mounted thereon;

FIG. 11 is a plan view of a modified form of the invention; and

FIG. 12 is a side-elevational view of the embodiment illustrated in FIG. 11.

Figure 7:
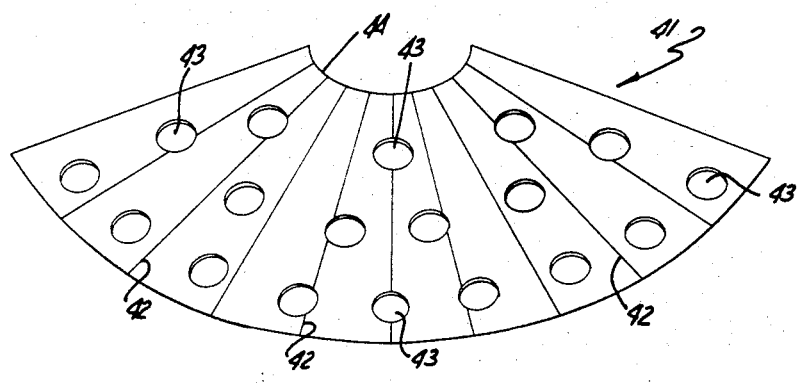
FIG. 7 is a perspective view of one section of the finger supporting cone.

Briefly, this invention comprises a pair of spaced first picking drums mounted for rotation on a suitable support. These first picking drums define a path of travel for the passage of poultry therebetween and rotate about axes that lie outwardly and along the path. A plurality of generally cone-shaped finger supports having their vertices pointed toward the path of travel of the bird are positioned below the first picking drums. These supports are rotated about axes which coincides with their vertices.

A plurality of flexible picking fingers are mounted at spaced intervals along the lateral areas of each of the frusto-conical finger supports. Because of the cone-like shape of the finger support, these fingers extend into the path of travel of the bird so as to generally fill the void existing along the lower section of the path because of the diverging circumferences of the two longitudinal picking drums. Means are provided whereby the height of the lower finger supports may be adjusted such that the neck and wings of the birds passing through the machine are sequentially wiped on all sides between the usually unused peripheral sections of the horizontal picking drums and the lower picking fingers. The space between the members may be adjusted such that the upper body, neck and wing sections of the birds will be wiped completely free of feathers and, yet, will not be broken or mutilated. Preferably, a guard assembly consisting of an elongated planar member having a plurality of support receiving apertures therein is supported over the cone-shaped finger supports in such a manner that the bases of the supports are generally co-planar therewith. The guard prevents the bird's neck and wing sections from becoming entangled between the rotating finger supports to insure breakage-free defeathering.

Referring now to the figures, a preferred embodiment of this invention will be described in detail. FIG. 1 shows a picking frame 10 having a plurality of adjustable uprights 11 and upper and lower cross members 12 and 13, respectively. While not shown, it will be readily understood by those skilled in the art that framework 10 extends rearwardly a sufficient distance to accommodate left-hand drum carriage 14 and right-hand drum carriage 15, thus necessitating a second set of adjustable uprights 11 and second sets of upper and lower cross members 12 and 13. Also, of course, framework 10 will incorporate some type of suitable longitudinal bracing.

Mounted on frame 10 are a left-hand drum carriage 14 and a right-hand drum carriage 15. Each of the carriages has an elongated longitudinal picking drum 20 rotatably mounted thereon by suitable means such as bearings 21. They are rotated in opposite directions by drive assemblies 22 such that birds positioned therebetween will tend to be pulled downwardly. Conventional means are provided for adjusting the lateral spacing between longitudinal drums 20. As indicated in FIG. 1, these means may comprise slidable mounting means for the carriages 14 and 15. Alternatively, a plurality of other suitable types of spacing devices are well-known in the art.

Longitudinal drums 20 have a plurality of picking fingers 24 extending from their peripheries as is well-known in the art. These fingers are positioned at spaced intervals along the entire length of the drums. They may be brought into abutting or intermeshing relationship as necessitated by the particular type of bird being processed by merely sliding carriages 14 and 15 in diverging or converging directions. A support 23 for the bird transporting conveyor (not shown) may be affixed directly to one of the carriages 14 or 15 or, alternatively, may be independently suspended from the ceiling of the particular plant in which the apparatus is to be located.

What has been described to this point consists merely of a conventional slant picker. If necessary, a more thorough understanding of devices of this type may be gained by reference to previously noted U.S. Patent 3,203,035 insofar as the horizontal drums 20 and their driving and adjustment mechanisms are concerned.

Referring now to FIGS. 2 through 7, the details of the lower picking assembly 30 will be described. An upper longitudinal support 31 and a lower longitudinal support 32 are held in spaced parallel relationship by means of a pair of end plates 33 affixed thereto by any suitable means such as welding. Vertically journaled within the longitudinal supports 31 and 32 by a plurality of suitable bearings 35 are a series of shafts 34. A finger supporting cone 40 is affixed to the upper extremity of each of the shafts.

Figure 9:
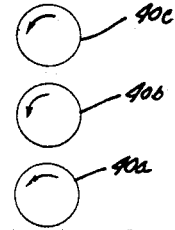
FIG. 9 is a schematic representation of the directions of rotation of the lower finger supports indicating the manner in which they interact with the longitudinal finger supports to insure that all of the feathers will be plucked from the bird after passage through the machine.
Figure 5:
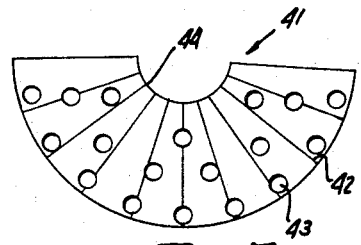
FIG. 5 is a plan view of one section of a lower finger support prior to the time that it is molded into its frusto-conical shape.

Each of the finger supporting cones 40 consist of a pair of cone sections 41 shown best in FIGS. 5 and 7. The sections 41 may conveniently be stamped from a sheet metal blank of suitable thickness and broken along lines 42 as indicated in FIG. 5 for added strength. The blank is then shaped as shown in FIG. 9 so as to form one-half of a frusto-conical surface having approximately a 15-degree angle of inclination. Two of these sections are fastened to each shaft 23 by means of a hub 45 to which they may be bolted, welded or affixed by any other conventional means. If necessary, downwardly extending lips may be provided on the mating edges of each two sections such that they may be bolted together at ponts which are circumferentially distant from their centers. The overall result is a generally frusto-conical shaped member composed of a plurality of generally triangular planar areas which converge towards a hub receiving section 44. The triangular segments, in addition to strengthening the support, provide planar areas upon which the base of the picking fingers may rest.

Each of the cone sections 41 has a plurality of finger receiving apertures 43 stamped or drilled in its lateral surface. As shown in FIG. 7, there are three axially concentric circles of such apertures such that, when mated, two such sections provide eighteen fingers at the outer periphery, twelve fingers at the middle, and six fingers at the inner periphery. Conventional picking fingers are received by apertures 43 by merely inserting them thereinto such that their circumferential grooves are retained within the aperture by cap 51 and shoulder 53. The fingers 50 lie relatively perpendicular to the particular segment of the finger support 40 to which they are attached.

As shown in FIG. 10, with finger support 40 stationary, there are three circles 50a, 50b and 50c of fingers on the cone 40. Each inwardly succeeding circle of fingers has its tips extending further upwardly than the preceding circle because of the inclination of support 40. Thus, circle 50b is higher than circle 50a and circle 50c is higher than both circles 50a and 50b. When the support 40 is rotated, the fingers assume the pattern indicated generally by the reference numeral 50' in FIGS. 1, 4 and 8.

As shown best in FIGS. 2 and 3, a plurality of finger supports are provided for each machine, six such supports being shown in the figures. Supports 40a, 40b and 40c are all driven by motor 62a which is mounted within the apparatus on a suitable bracket 61a. Rotational thrust is transmitted from motor 62a by its pulley 63a to pulley 64a by means of belt 65a. Pulley 66a transmits this thrust to pulley 67a by means of belt 68a. Finally, the thrust is transmitted by means of pulley 69a to pulley 72a by means of belt 71a. Suitable enclosures are provided for preventing feathers from fouling the drive mechanisms.

The over-all result of this driving arrangement is to cause finger supports 40a, 40b and 40c to be rotated in identical directions by motor 62a. Power is supplied to finger supports 40d, 40e and 40f from motor 62b such that all of these finger supports rotate in the same direction. Thus, all six of the finger supporting cones rotate in the same direction.

The apparatus is mounted on framework 10 by means of adjustment assembly 80. As shown best in FIGS. 2, 3 and 4, adjustment assembly 80 comprises a stationary plate 81 having a pair of inwardly extending guiding members 82 affixed thereto. The over-all shape is such that the end plate 33 which carries the rotating support assemblies is vertically slidably received by stationary plate 81. Plate 81 is secured to the framework 10 of the picking machine by any suitable means such as tongues 83 which may be bolted, riveted or welded to the framework. Stationary plate 81 has a pair of mounting brackets 84 extending outwardly therefrom and has an adjustment slot 88 in its surface. Adjustment tongue 86 which is affixed to end plate 33 extends through adjustment slot 88. A threaded shaft 85 is secured by mounting brackets 84 and tongue 86 is passed thereover by means of a suitable aperture. Two adjustment nuts 87, positioned on either side of tongue 86, complete the adjustment assembly 80 as indicated best in FIG. 3.

An identical adjustment assembly is provided at the opposite extremity of the machine. The result is such that end plates 33, and thus the entire lower picking assembly 30 may be selectively raised or lowered by rotating nuts 87 in the desired direction. The top nuts, of course, serve merely to stabilize the lower picking assembly.

Because of the different types of birds which are processed, it is impossible to accurately describe appropriate settings for the picking mechanisms. Sometimes, it is desirable to have horizontal drums 20 intermesh as they rotate while other types of birds might be more efficiently defeathered if the horizontal picking drums do not intermesh. Similarly, the lower picking assemblies must be vertically adjusted to obtain the best results depending upon the particular type of bird being processed.

It has been found that a cone-shaped support having a base diameter of approximately twelve inches may be utilized in conjunction with horizontal drums having an over-all diameter of approximately eighteen inches. In such a system, the fingers on the upper drum should protrude from their supports approximately four and one-half inches. The picking fingers on the cone-shaped support should protrude approximately three and one-half inches from their supports. Suitable results may be obtained by rotating the cone-shaped supports at approximately 650 revolutions per minute on the longitudinal drums at approximately 450 revolutions per minute.

Figure 8:
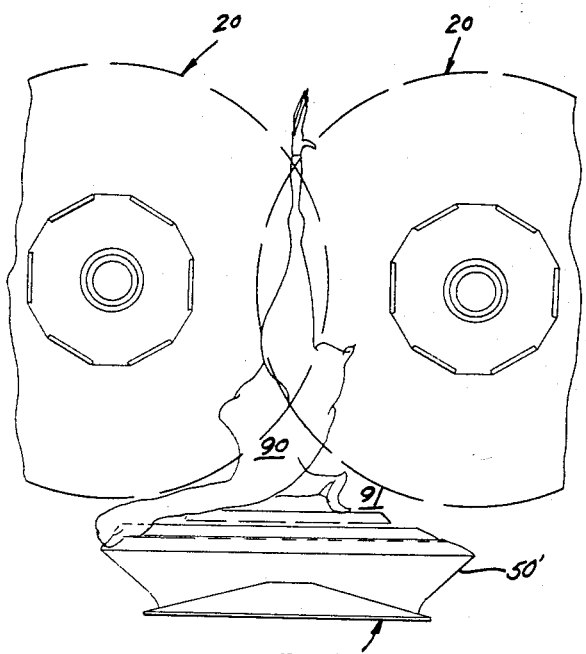
FIG. 8 is a fragmentary end-elevational view of the picking machine indicating the picking forces to which the bird is subjected as it passes therethrough.

As an initial setting, the tips of the picking fingers on the lower conical supports should be brought within approximately one inch of the outer peripheries of the horizotal picking drums. Referring to FIG. 8, it will be seen that as the bird is passed between horizontal picking drums 20, it sequentially contacts the lower picking fingers, which because of the centrifugal force exerted on them, assume an over-all shape as indicated generally by the reference numeral 50'. As the upper extremity of the chicken contacts the edge of one of the pickers 40, it is forced sidewardly such that the head and neck sections thereof are wiped between one of the horizontal picking drums 20 and the fingers 50 on conical finger support 40. Because of the conical shape of finger support 40, the outline of finger pattern 50' generally coincides with the circumference of the picking drums 20 and thus the upper section of the bird's body is wiped clean of feathers without subjecting it to undesirable breakage and mutilation.

As will be seen from reference to FIG. 9, each time the bird passes from one of the lower picking cones to the succeeding picking cone, it is engaged in a different direction by the picking fingers 50 on the outer peripheries of supports 40, and thus, forced between fingers 50 and the opposite horizontal drum 20 by which it has previously been wiped. That is to say, because the picking cones 40 are all rotating in an identical direction, adjacent segments of their peripheries are rotating in opposite directions. This factor further assures that the bird will be wiped completely clean of feathers.

Depending upon the particular types of birds being processed, a tendency may exist for the neck and wing sections to fall or be pulled between adjacent conical finger supports 40 during the defeathering operation. Such falling or pulling is highly undesirable, of course, since it subjects the neck and wing sections to forces likely to bruise and mutilate them. FIGS. 11 and 12 illustrate a guard assembly 90 which has been found effective in preventing such mutilization. The assembly preferably consists of a pair of separable plates 91 and 91' each having a series of semi-circular cuts, 92 and 92' respectively, in their surfaces. The edges 93 and 93' of the cuts form islands between the conical finger supports 40. Conveniently, downwardly extending tabs 94 may be provided at the terminal edges of the islands to provide a means whereby the two sections of the guard assembly may be stabilized during use by bolts or the like.

The upper surface of the guard assembly is coplanar, preferably, with the edges 95 of the finger supports and the circular apertures formed therein by the mating of the two sections closely approximate the circular configuration of the supports at this point. A hinged ramp 96 may be provided for assisting entry of the birds into the machine. Additional strength may be achieved by turning the outer edge 97 of the sections downwardly as is well known in the metal working art.

In operation, as the birds pass from one rotating support 40 to the succeeding support and are moved to the opposite side of the machine as previously discussed in connection with FIG. 9, any tendency for the necks or wings to bind between the supports is alleviated by the presence of the islands formed by abutting edges 93 and 93'. The machine may be thoroughly cleaned by merely removing the two sections 91 and 91' therefrom. Forming the ramp in two sections as shown, of course, greatly facilitates this removal and is important since Department of Agriculture standards usually require that the entire machine be cleaned at least daily.

While a preferred embodiment of this invention has been described in detail, it will be apparent to those skilled in the art that a number of modifications thereof may be made without departing from the spirit and scope of the invention. Such embodiments are to be deemed included in the appended claims unless these claims, by their terms, expressly state otherwise.

I claim:

1. A poultry picking apparatus comprising: a picking frame; a pair of first drum-shaped finger supports, said first supports being rotatably mounted in generally parallel fashion on said frame to define therebetween a path of travel for the passage of poultry through said apparatus, each of said first supports being rotatable with axes substantially parallel to said path and having flexible picking fingers extending radially therefrom for rotation therewith; at least two second finger supports mounted on said frame and rotatable about axes oriented toward said path, said second finger supports being positioned below said path and having flexible picking fingers extending upwardly therefrom and into said path, the tips of the flexible fingers mounted on each said second finger support being different distances from a plane lying perpendicular to the axes of rotation of said second supports and on the opposite side of said supports from said tips, those tips adjacent said axes being a greater distance from said plane than those tips removed from said axes; and means for rotating said first and second finger supports.

2. A poultry picking apparatus comprising: a picking frame; a pair of first drum-shaped finger supports, said first supports being rotatably mounted in generally parallel fashion on said frame to define therebetween a path of travel for the passage of poultry through said apparatus, each of said first supports being rotatable about axes substantially parallel to said path and having flexible picking fingers extending radially therefrom for rotation therewith; at least two second finger supports mounted on said frame and rotatable about axes oriented toward said path, said second finger supports being positioned below said path, and having flexible picking fingers extending upwardly therefrom and into said path; means for rotating said first finger supports; and, means for rotating said second finger supports in identical directions such that the adjacent segments of their outer peripheries travel in opposite directions with respect to one another.

3. A poultry picking apparatus comprising: a picking frame; a pair of first drum-shaped finger supports, said first supports being rotatably mounted in generally parallel fashion on said frame to define therebetween a path of travel for the passage of poultry through said apparatus, each of said first supports being rotatable about axes substantially parallel to said path and having flexible picking fingers extending radially therefrom for rotation therewith; at least two second finger supports mounted on said frame and rotatable about axes oriented toward said path, said second finger supports being positioned below said path and having flexible picking fingers extending upwardly therefrom and into said path, said second finger supports being generally frusto-conical in shape and having their vertices pointed toward said path and coincident with their axes of rotation; and means for rotating said first and second finger supports.

4. The combination as set forth in claim 3 in which each said generally frusto-conical member comprises a plurality of abutting generally triangular, planar segments.

5. The combination as set forth in claim 3 in which there are more than two of said second finger supports positioned adjacent said path.

6. The apparatus as set forth in claim 5 which further comprises an elongated planar member affixed to said frame having a plurality of apertures therein through which said second finger supports protrude, whereby poultry being picked will not drop between the sides of said second finger supports.

7. The apparatus as set forth in claim 6 wherein the upper surface of said planar member is generally coplanar with the bases of said generally frusto-conical members.

8. The apparatus as set forth in claim 6 wherein said elongated planar member is separable along its longitudinal axis into two sections to facilitate its removal from said apparatus for cleaning purposes.

9. The apparatus as set forth in claim 3 which further comprises guard means positioned generally perpendicular to the axis of rotation of said second support to prevent poultry from striking the edge of said second support.

10. The apparatus as set forth in claim 6 wherein said planar member has a sloping approach slide at the extremity thereof to facilitate passage of poultry into said apparatus.

11. The combination as set forth in claim 3 in which the axis of rotation of said second finger support is perpendicular to said path.

References Cited

UNITED STATES PATENTS

| | | | |
|---|---|---|---|
| 3,203,035 | 8/1965 | De Long | 17—11.1 |
| 2,389,404 | 11/1945 | Barker | 17—11.1 |
| 2,710,985 | 6/1955 | Zebarth | 17—11.2 |
| 2,991,497 | 7/1961 | McKinley et al. | 17—11.1 |
| 3,234,587 | 2/1966 | Corn | 17—11.1 |
| 3,277,515 | 10/1966 | Engkjer et al. | 17—11.1 |

LUCIE H. LAUDENSLAGER, *Primary Examiner.*

UNITED STATES PATENT OFFICE
CERTIFICATE OF CORRECTION

Patent No. 3,441,979      Dated May 6, 1969

Inventor(s) A. L. Masters

It is certified that error appears in the above-identified patent and that said Letters Patent are hereby corrected as shown below:

Column 6, line 54;

"each of said first supports being rotatable with axes" should be -- each of said first supports being rotatable about axes --.

SIGNED AND SEALED

NOV 4 1969

(SEAL)
Attest:

Edward M. Fletcher, Jr.
Attesting Officer

WILLIAM E. SCHUYLER, JR.
Commissioner of Patents